(12) United States Patent
Lee et al.

(10) Patent No.: US 9,342,168 B2
(45) Date of Patent: May 17, 2016

(54) INPUT APPARATUS, DISPLAY APPARATUS, CONTROL METHOD THEREOF AND DISPLAY SYSTEM

(71) Applicant: SAMSUNG ELECTRONICS CO., LTD., Suwon-si (KR)

(72) Inventors: Dong-heon Lee, Seoul (KR); Yong-hwan Kwon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 266 days.

(21) Appl. No.: 13/735,379

(22) Filed: Jan. 7, 2013

(65) Prior Publication Data

US 2013/0176254 A1  Jul. 11, 2013

(30) Foreign Application Priority Data

Jan. 6, 2012  (KR) .................. 10-2012-0001756
Jan. 9, 2012  (KR) .................. 10-2012-0002420
Jun. 19, 2012 (KR) .................. 10-2012-0065397

(51) Int. Cl.
G06F 3/041    (2006.01)
G06F 3/01     (2006.01)
G06F 3/048    (2013.01)
G06F 3/0346   (2013.01)

(52) U.S. Cl.
CPC .............. *G06F 3/041* (2013.01); *G06F 3/017* (2013.01); *G06F 3/0346* (2013.01); *G06F 3/048* (2013.01)

(58) Field of Classification Search
None
See application file for complete search history.

(56) References Cited

U.S. PATENT DOCUMENTS

| 7,903,084 | B2 | 3/2011 | Marvit et al. |
| 2007/0226646 | A1* | 9/2007 | Nagiyama et al. ............ 715/784 |
| 2010/0123664 | A1* | 5/2010 | Shin et al. ..................... 345/169 |
| 2010/0277337 | A1 | 11/2010 | Brodersen et al. |
| 2011/0025633 | A1 | 2/2011 | Janik |
| 2011/0179387 | A1* | 7/2011 | Shaffer ............... G06F 3/04883 715/835 |
| 2011/0246015 | A1* | 10/2011 | Cummings et al. ............. 701/23 |
| 2011/0248941 | A1* | 10/2011 | Abdo ..................... G06F 3/0488 345/173 |
| 2011/0283314 | A1* | 11/2011 | Tang et al. ....................... 725/37 |
| 2011/0285658 | A1* | 11/2011 | Homma et al. ............... 345/173 |
| 2011/0310050 | A1* | 12/2011 | Chiang .................. G06F 3/017 345/174 |
| 2012/0062551 | A1 | 3/2012 | Lee et al. |
| 2012/0274547 | A1* | 11/2012 | Raeber .............. G06F 17/30011 345/156 |
| 2012/0306773 | A1* | 12/2012 | Yeung .......................... 345/173 |

* cited by examiner

FOREIGN PATENT DOCUMENTS

JP    2010-244480 A    10/2010

OTHER PUBLICATIONS

International Search Report issued Aug. 30, 2013, in corresponding Application No. PCT/KR2013/004448.

*Primary Examiner* — Joseph Haley
*Assistant Examiner* — Emily Frank
(74) *Attorney, Agent, or Firm* — Sughrue Mion, PLLC

(57) ABSTRACT

An input apparatus, a display apparatus, a control method thereof and a display system are provided. The input apparatus includes: a communication unit which communicates with the display apparatus; a touch sensor which senses a touch input; a motion sensor which senses a motion of the input apparatus; and a controller which determines whether a value of a touch input, that sensed by the touch sensor when the input apparatus operates in a gesture mode according to the motion of the input apparatus, is greater than or equal to a first reference value, and changes an input mode of the input apparatus to a touch mode if it is determined that the value of the touch input greater than or equal to the first reference value.

44 Claims, 13 Drawing Sheets

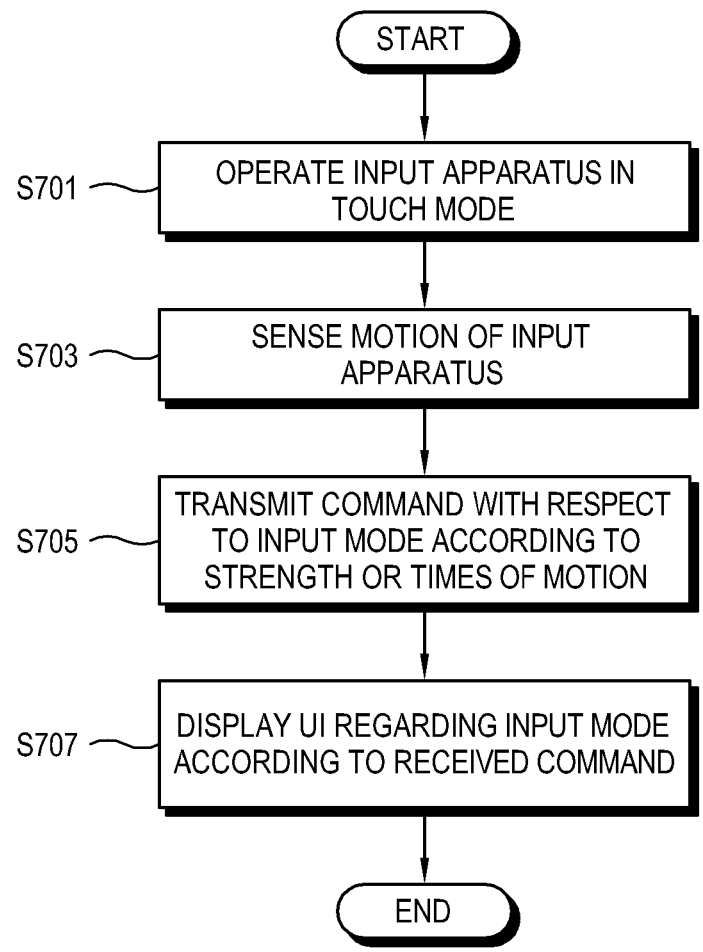

INPUT APPARATUS, DISPLAY APPARATUS, CONTROL METHOD THEREOF AND DISPLAY SYSTEM

CROSS-REFERENCE TO RELATED APPLICATIONS

This application claims priority from Koreas Patent Application No. 10-2012-0001756 filed, on Jan. 6, 2012, Korean Patent Application No. 10-2012-0002420 filed on Jan. 9, 2012 and Korean Patent Application No. 10-2012-0065397 filed on Jun. 19, 2012, the disclosures of which are incorporated herein by reference.

BACKGROUND

1. Field

Apparatuses and methods consistent with exemplary embodiments relate to an input apparatus, a display apparatus, a control method thereof and a display system, and more particularly, to an input apparatus, a display apparatus, a control method thereof and a display system which displays an input mode of the input apparatus.

2. Description of the Related Art

A display system displays an image based on an image signal that is supplied from an external source or generated by the display system itself, and includes a plurality of apparatuses as well as a display apparatus having a display panel to display an image thereon to perform various functions. The display system may incorporate various types of apparatuses depending on functions to be performed. For example, the display system may include a display apparatus and an input apparatus which transmits various commands to the display apparatus. Generally, the input, apparatus is implemented as a remote controller of the display apparatus.

The input apparatus may include a touch sensor to sense a touch input of a user and a motion sensor to sense a motion of the input apparatus. The input apparatus may operate in one of a touch mode according to a touch input of the use, and a gesture mode according to a motion of the input apparatus. The two modes are interchanged by using a mode changing button of the remote controller.

However, a user should manipulate the mode changing button as designated to change the mode while operating the remote controller mid such manipulation suspends the interaction and a user may be less focused on the manipulation of the interface mid may feel inconvenienced.

If a user is not informed of the change of the mode, the user may not be aware of the input mode of the input apparatus and may feel inconvenienced in using the input apparatus.

SUMMARY

According to an aspect of an exemplary embodiment, there is provided an input apparatus of a display apparatus, the input apparatus including: a communication unit which communicates with the display apparatus; a touch sensor which receives a user's touch input; a motion sensor which senses a motion of the input apparatus; and a controller which changes an input mode of the input apparatus to a touch mode if a user's touch input that is a first reference value or more is sensed while the input apparatus operates in a gesture mode according to the motion of the input apparatus.

The controller may change the input mode of the input apparatus to the gesture mode if a motion of the input apparatus that is a second reference value or more is sensed when the input apparatus operates in the touch mode.

The controller may control the communication unit to transmit a command to the display apparatus to display a user interface (UI) regarding the change of the input mode.

The UI may display a process of changing the input mode in the display apparatus by stages.

The UI may be adjusted by stages by using a degree of transparency according to the change of the input mode.

The controller may control the communication unit to transmit a command to display the UI opaquely if the change of the input mode is completed.

The UI may include a gauge which displays the change of the input mode by stages.

The controller may disregard the user's touch input which is less than the first reference value in the gesture mode, and disregard the motion of the input mode that is less than the second reference value in the touch mode.

The first reference value may include a value corresponding to at least one of a drag to a predetermined distance or more, a touch with a predetermined strength or more and a touch by predetermined times or more with respect to the touch sensor, mid the second reference value may include a value corresponding to at least one of a motion to a predetermined distance or more, with a predetermined strength or more and by predetermined times or more sensed by the motion sensor.

According to an aspect of another exemplary embodiment, there is provided an input apparatus of a display apparatus including: a communication unit which communicates with the display apparatus; a touch sensor which receives a user's touch input; a motion sensor which senses a motion of the input apparatus; and a controller which changes an input mode of the input apparatus to a gesture mode if a motion of the input apparatus that is a second reference value or more is sensed when the input apparatus operates in a touch mode according to the user's touch input.

The controller may control the communication unit to transmit a command to the display apparatus to display a UI indicating a process of changing the input mode of the input apparatus by stages according to at least one of strength, times and distance of a motion of the input apparatus that is sensed by the motion sensor.

The UI may further include information regarding at least one of distance, strength and times of a motion which is needed to complete the change of the input mode.

According to an aspect of another exemplary embodiment, there is provided a display apparatus including: a display unit which displays an image; a communication unit which communicates with an input apparatus of the display apparatus; and a controller which controls the display unit to display a UI thereon regarding a change of the input mode of the input apparatus to a touch mode if a command for changing the input mode from a gesture mode to the touch mode is received through the communication unit.

The controller may control the display unit to display a UI regarding the change of the input mode to the gesture mode if a command for changing the input mode from the touch mode to the gesture mode is received.

The UI may display a process of changing the input mode by stages.

The UI may be adjusted by stages by using a degree of transparency according to the change of the input mode.

The controller may control the display unit to display the UI opaquely if the change of the input mode is completed.

The UI may include a gauge which displays the change of the input mode by stages.

According to an aspect of another exemplary embodiment, there is provided a display apparatus including: a display unit which displays an image; a communication unit which communicates with an input apparatus of the display apparatus; and a controller which controls the display unit to display a UI regarding a change of an input mode of the input apparatus to a gesture mode if a command for changing the input mode from a touch mode to the gesture mode is received through the communication unit.

The UI may display the change of the input mode to the gesture mode by stages.

The UI may further include information regarding at least one of distance, strength and times of a motion which is needed to complete the change of the input mode.

According to an aspect of another exemplary embodiment, there is provided a control method of an input apparatus of a display apparatus, the control method including: operating the input apparatus in a gesture mode as an input mode according to a motion of the input apparatus; sensing a user's touch input; mid changing the input mode to a touch mode if the sensed touch input is a first reference value or more.

The control method may further include sensing a motion of the input, apparatus; and changing the input mode to the gesture mode if the sensed motion is a second reference value or more.

The control method may further include transmitting a command to the display apparatus to display a UI regarding a change of the input mode.

The UI may display a process of changing the input mode by stages in the display apparatus.

The UI may be adjusted by stages by using a degree of transparency according to the change of the input mode.

The control method may further include transmitting a command to display the UI opaquely if the change of the input mode is completed.

The UI may include a gauge to display the change of the input mode by stages.

The control method may further include disregarding a motion of the input apparatus which is less than the second reference value if the input apparatus is changed to the touch mode.

The control method may further include disregarding the user's touch input that is less than the first reference value if the input apparatus is changed to the gesture mode.

The first reference value may include a value corresponding to at least one of a drag to a predetermined distance or more, a touch with a predetermined strength or more and a touch by predetermined times or more with respect to the touch sensor, and the second reference value may include a value corresponding to at least one of a motion to a predetermined distance or more, with a predetermined strength or more and by predetermined times or more sensed by the motion sensor.

According to an aspect of another exemplary embodiment, there is provided a control method of an input apparatus of a display apparatus, the control method including: operating the input apparatus in a touch mode as an input mode according to a user's touch input; sensing a motion of the input apparatus; and changing the input mode to a gesture mode if the sensed motion is a second reference value or more.

The control method may further include transmitting a command to the display apparatus to display a UI by stages regarding a change of the input mode.

The transmitting the command may include transmitting a command to the display apparatus to display information regarding at least one of distance, strength and times of a motion which is needed to complete the change of the input mode.

According to an aspect of another exemplary embodiment, there is provided a control method of a display apparatus including: receiving a command from an input apparatus to change an input mode from a gesture mode to a touch mode; and displaying a UI for changing the input mode to the touch mode based on the received command.

The control method may further include receiving a command from the input apparatus to change the input mode from the touch mode to the gesture mode; and displaying a UI for changing the input mode to the gesture mode based on the received command.

The control method may further include displaying a process of changing the input mode by stages.

The displaying by stages may include adjusting a degree of transparency of the UI by stages according to the change of the input mode.

The control method may further include displaying the UI opaquely if the change of the input mode is completed.

The displaying by stages may include displaying the change of the input mode by stages through a gauge.

According to an aspect of another exemplary embodiment, there is provided a control method of a display apparatus including: receiving a command from an input apparatus to change an input mode from a touch mode to a gesture mode; and displaying a HI for changing the input mode to the gesture mode based on the received command.

The displaying the UI may include displaying the change of the input mode to the gesture mode by stages.

The displaying the UI may include displaying information regarding at least one of distance, strength and times of a motion which is needed to complete the change of the input mode.

According to an aspect of another exemplary embodiment, there is provided a display system including: a display apparatus which communicates with an input apparatus and displays a UI according to a command transmitted by the input apparatus; and an input apparatus which communicates with the display apparatus, includes a touch sensor to receive a user's touch input and a motion sensor to sense a motion of the input apparatus, changes an input mode of the input apparatus from a gesture mode to a touch mode if a user's touch input that is a first reference value or more is sensed when the input apparatus operates in the gesture mode, changes the input mode of the input apparatus from the touch mode to the gesture mode if a motion, of the input apparatus that is a second reference value or more is sensed when, the input apparatus operates in the touch mode, and transmits a command to the display apparatus to display a UI regarding the change of the input mode.

The UI displays the change of the input mode by stages.

BRIEF DESCRIPTION OF THE DRAWINGS

The above and/or other aspects will become apparent and more readily appreciated from the following description of exemplary embodiments, taken in conjunction with the accompanying drawings, in which:

FIG. 13 is a flowchart showing a control method of a display system according to the second exemplary embodiment.

DETAILED DESCRIPTION OF EXEMPLARY EMBODIMENTS

Figure 1:
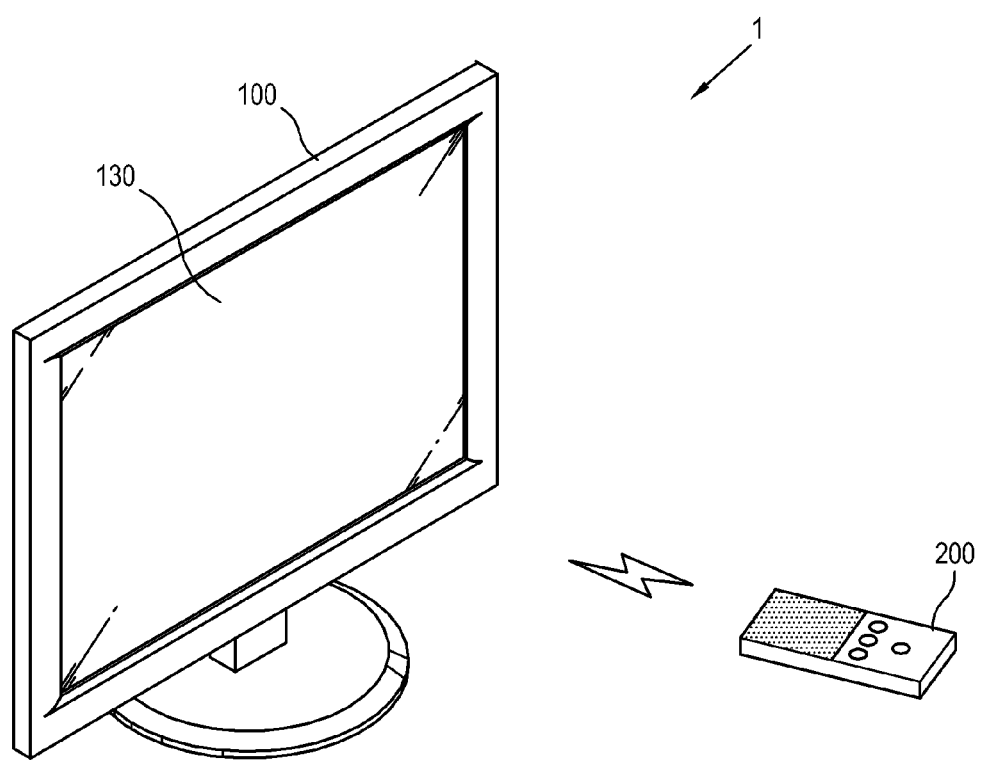
FIG. 1 illustrates a display system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates a display system 1 according to an exemplary embodiment.

As shown therein, the display system 1 according to the present exemplary embodiment includes a display apparatus 100 which processes an image signal according to a preset processing operation and displays an image based on the processed image signal, and an input apparatus 200 which generates and transmits preset commands/data/information/signals to the display apparatus 100 to remotely control the display apparatus 100.

The present exemplary embodiment relates to the display system 1 including the display apparatus 190 which is implemented as a television (TV) displaying a broadcasting image based on broadcasting signals/broadcasting information/broadcasting data transmitted by transmission equipment of a broadcasting station, and the input apparatus 290 which is implemented as a remote controller. However, the type of an image that is displayable by the display apparatus 100 is not limited to a broadcasting image, and may include video, still images, applications, on-screen display (OSD), a user interface (UI) for controlling various operations (hereinafter, to be also called "graphic user interface (GUI)") and other images, based on signals/data supplied by various types of image supply sources (not shown).

The inventive concept may also apply to other display systems which differ from the present exemplary embodiment, such as a system including monitor connected to a computer main body as the display apparatus 100, and the input apparatus 200 communicating with the computer main body. That is, the exemplary embodiment which will be described hereinafter is one of various exemplary embodiments of the display system 1, and the inventive concept is not limited thereto.

The input apparatus 200 is an external apparatus which may communicate with the display apparatus 100 in a wireless manner, and the wireless communication includes infrared communication and radio frequency (RF) communication. The input apparatus 200 transmits a preset command to the display apparatus 100 according to a user's manipulation.

The input apparatus 200 according to the present exemplary embodiment includes a touch sensor 210 which senses a user's touch input, and a motor sensor 220 which senses a motion of the input apparatus 200 by a user. The motion sensor 220 includes a gyro sensor, an angular velocity sensor, and a terrestrial magnetism sensor. Thus, the display apparatus 100 may control an image displayed by the display unit 130, according to touch information or motion information transmitted by the input apparatus 200.

Figure 2:
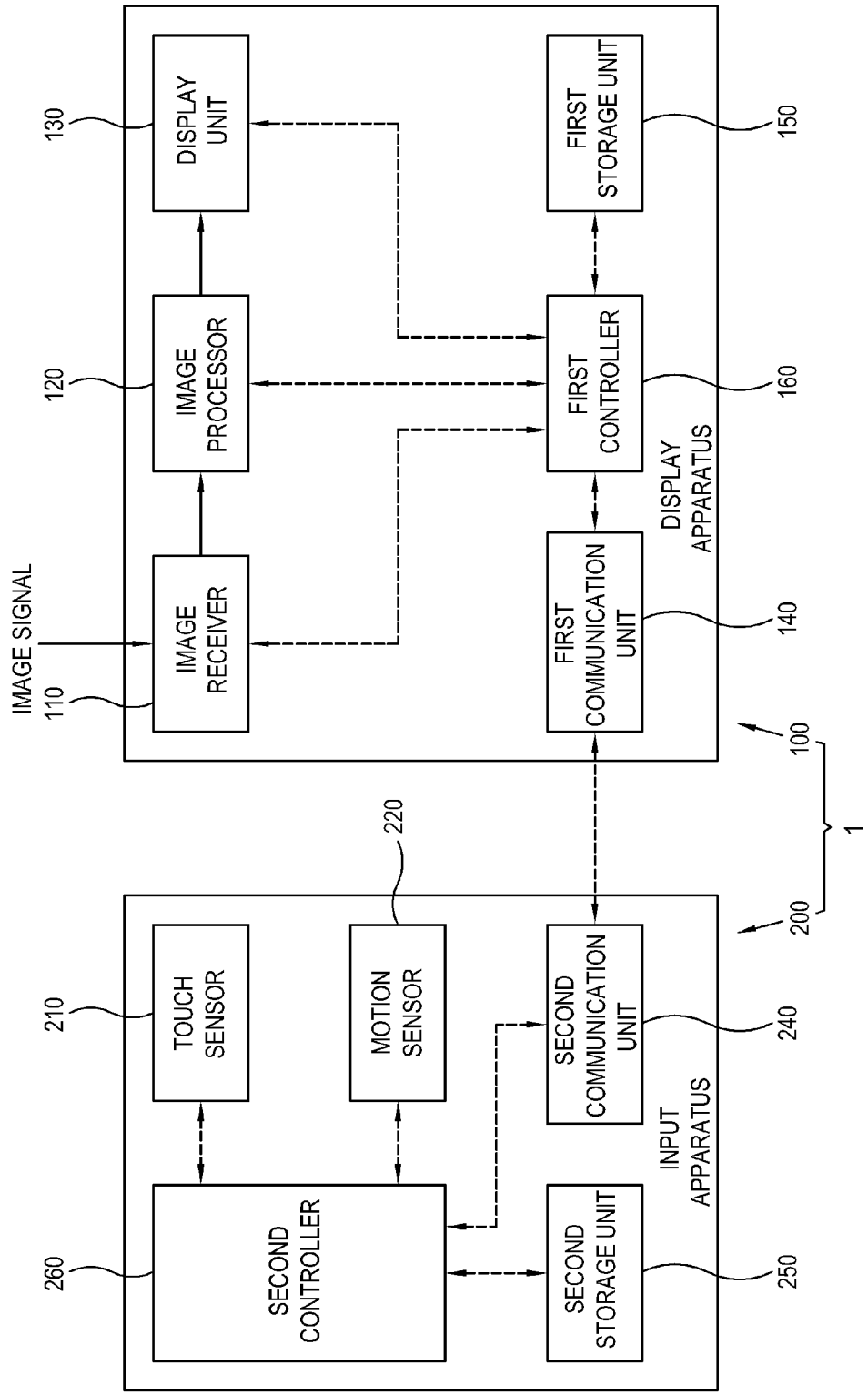
FIG. 2 is a block diagram of the display system according to the exemplary embodiment.

Hereinafter, configurations of the display apparatus 100 and the input apparatus 200 according to the present exemplary embodiment will be described in detail. FIG. 2 is a block diagram of the display system 1 according to the exemplary embodiment.

As shown therein, the display apparatus 100 includes an image receiver 110 configured to receive an image signal, an image processor 120 configured to process the image signal received by the image receiver 110, a display unit 130 configured to display an image thereon based on the image signal processed by the image processor 120, a first communication unit 140 configured to communicate with the outside, a first storage unit 150 configured to store data therein, and a first controller 160 configured to control the display apparatus 100.

The input apparatus 200 includes a touch sensor 210 configured to sense a user's touch input, a motion sensor 220 configured to sense a motion of the input apparatus 200, a second communication unit 240 configured to communicate with the outside, a second storage unit 240 configured to store data therein, and a second controller 260 configured to control the second communication unit 240 to transmit a command to the display apparatus 100 based on a sensing result of the touch sensor 210 or the motion sensor 220. The input apparatus 200 may further include various menu keys, number keys and other buttons which may be manipulated by a user.

Hereinafter, a detailed configuration of the display apparatus 100 will be described.

The image receiver 110 receives an image signal and transmits the received image signal to the image processor 120. The image receiver 110 may be implemented in various configurations corresponding to a standard of a received image signal and an implementation of the display apparatus 100. For example, the image receiver 110 may receive an radio frequency (RF) signal transmitted in a wireless manner from a broadcasting station (not shown), or receive an image signal transmitted in a wired manner according to standards such as composite video, component video, super video, SCART, high definition multimedia interface (HDMI). If an image signal is a broadcast signal, the image receiver 110 includes a tuner to tune the broadcast signal by channel.

The image signal may be input by an external apparatus, e.g., a personal computer (PC), audio/video (A/V) devices, smart phone and smart pad. The image signal may result from data which are transmitted through a network such as the Internet. In this case, the display apparatus 100 may perform a network communication through the first communication unit 140 or further include an additional network communicator. The image signal may result from data which are stored in the first storage unit 150 that is a non-volatile memory such as a flash memory or a hard disc drive. The first storage unit 150 may be provided within the display apparatus 100 or may be provided outside the display apparatus 100. If the first storage unit 150 is provided outside the display apparatus 100, the display apparatus 100 may further include a connector (not shown) to be connected to the first storage unit 150.

The image processor 120 performs various image processing operations with respect to an image signal. The image processor 120 outputs the processed image signal to the display unit 130, on which an image is displayed on the basis of the image signal.

The types of image processing operations performed by the image processor 120 may include a decoding operation corresponding to various image formats, a de-interlacing operation, a frame refresh rate conversion operation, a scaling operation, a noise reduction operation for improving an image quality, a detail enhancement operation, a line scanning operation, etc., but not limited thereto. The image processor 120 may be implemented as a group of individual elements performing the foregoing processes independently, or as a system-on-chip (SOC) integrating the foregoing processes.

The display unit 130 displays an image based on an image signal which is processed by the image processor 120. The display unit 130 may be implemented as various display panels including liquid crystal, plasma, light-emitting diode (LED), organic light-emitting diode (OLED), surface-conduction electron-emitter, carbon nano-tube, and nano-crystal, but is not limited thereto.

The display unit 130 may further include additional components according to its embodiment type. For example, if the display unit 130 includes liquid crystal, the display unit 130 includes an LCD panel (not shown), a backlight unit (not shown) emitting light to the LCD panel, and a panel driving substrate (not shown) driving the panel.

The display unit 130 according to the present exemplary embodiment displays a user interface (UI) indicating an input mode of the input apparatus 200. The UI includes text and icons (graphics), wherein the text includes numbers and letters. If the display unit 130 is a touch screen, a user may touch the UI displayed by the display unit 130 which transmits a command to the first controller 160 corresponding to the touch input.

The first communication unit 140 transmits commands, data, information, and/or signals from the input apparatus 200 to the image processor 120. The first communication unit 140 may transmit commands, data, information, and/or signals from the image processor 120 to the input apparatus 200. The first communication unit 140 may use wireless communication between the display apparatus 100 and the input apparatus 200. The wireless communication may include infrared communication, RF communication, Zigbee and Bluetooth.

According to the present exemplary embodiment, the first communication unit 140 is included in the display apparatus 100, but the inventive concept not limited thereto. Alternatively, the first communication unit 140 may be implemented as a dongle or a module and detachably mounted in a connector (not shown) of the display apparatus 100 connected to the image processor 120.

The first storage unit 150 stores data therein according to a control of the first controller 160. The first storage unit 150 includes a non-volatile storage medium such as a flash memory or a hard disc drive. The first storage unit 150 is accessed by the first controller 160, which reads, records, modifies, deletes, and updates data stored in the first storage unit 150.

The data which are stored in the first storage unit 150 include an operating system (OS) for driving the display apparatus 100, and various applications which are executed on the OS, and image data and additional data.

The first controller 160 controls various elements of the display apparatus 100. For example, the first controller 160 controls the image processor 120 to perform an image processing operation, and performs a corresponding control operation with respect to a command from the input apparatus 100 to thereby control the entire operations of the display apparatus 100.

The first controller 160 according to the present exemplary embodiment controls the display unit 130 to display UIs (31, 32, 35 and 36 in FIGS. 3 to 5, and 61, 62 and 63 in FIGS. 8 to 12) indicating an input mode (e.g., touch mode or gesture mode) of the input apparatus 200, based on a command transmitted by the input apparatus 200.

Hereinafter, a detailed configuration of the input apparatus 200 will be described.

The input apparatus 200 according to the present exemplary embodiment operates in one of a plurality of input modes, which includes a touch mode in which the input apparatus 200 operates according to a user's touch input to a touch sensing unit, and a gesture mode in which the input apparatus 200 operates according to a motion of the input apparatus 200.

For example, the input apparatus 200 may scroll a page from a screen displayed by the display apparatus 100, according to a motion thereof in the gesture mode, and may select an item from a screen displayed by the display apparatus 100 by a user's touch input in the touch mode.

In the exemplary embodiment, the input apparatus 200 is set to operate in the gesture mode with respect to a larger motion such as the page scroll, and to operate in the touch mode with respect to a smaller motion such as the selection of the item. However, the exemplary embodiment is not limited to the foregoing, and other various user's inputs may apply.

The touch sensor 210 includes a touch sensing unit which senses a user's touch input. The user's touch input may vary including tapping, clicking, double clicking, dragging, sliding, and flicking. If the touch sensor 210 senses a user's touch input, the second controller 260 generates and transmits a command to the display apparatus 100 corresponding to the sensed touch input.

The motion sensor 220 includes a motion sensing unit which senses a motion of the input apparatus 200. The motion sensing unit includes a gyro sensor, an angular velocity sensor and a terrestrial magnetism sensor. The motion sensor 220 measures acceleration and angular velocity with respect three or six axes of the input apparatus 200 from a current position of the input apparatus 200, and transmits the measurement result to the second controller 260. The second controller 250 generates and transmits a command to the display apparatus 100 through the second communication unit 240 corresponding to motion information of the input apparatus 200.

The second communication unit 240 communicates with the display apparatus 100, and utilizes a communication standard corresponding to the first communication unit 140. For example, the second communication unit 240 transmits and receives a predetermined command through a wireless communication, which includes infrared communication, RF communication, Zigbee and Bluetooth.

Accordingly, the display apparatus 100 may perform a control operation corresponding to the command.

The second storage unit 250 stores data therein, which are accessed by the second controller 260. Data of the current input mode of the input apparatus 200 which are stored in the second storage unit 250 are read, stored and updated, and posture information are read, stored and updated to sense a motion of the input apparatus 100.

The second controller 250 calculates motion information of the input apparatus 200 based on angular velocity and acceleration of the input apparatus 200 sensed by the motion sensor 220. The second controller 260 compares the calculated motion information with the posture information stored in the second storage unit 250 and adjusts the motion information and transmits the result as a predetermined command to the display apparatus 100 through the second communication unit 240.

The second storage unit 250 is implemented as a non-volatile storage medium such as a flash memory. The second storage unit 250 is accessed by the second controller 260, which reads, records, modifies, deletes and/or updates the data stored in the second storage unit 250.

The second controller 260 changes the input mode of the input apparatus 200 according to one of a user's touch input to the touch sensor 210 and a motion of the input apparatus 200 sensed by the motion sensor 220, and controls the second communication unit 240 to transmit a corresponding command to the display apparatus 100.

Figure 3:
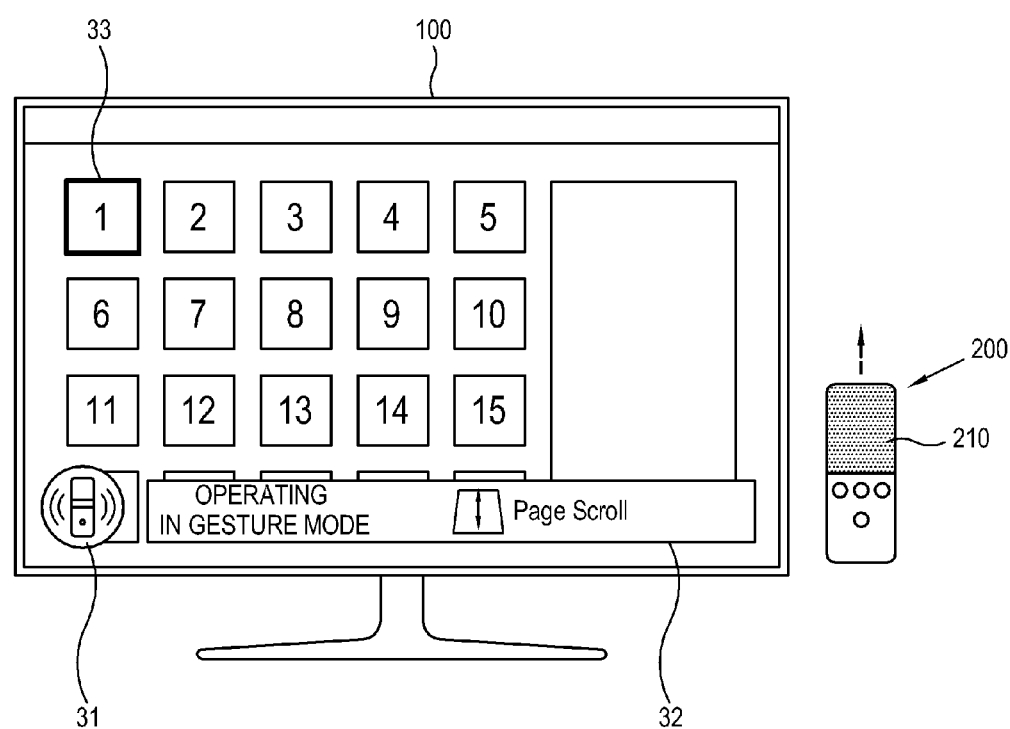
FIGS. 3 to 5 illustrate a screen which is displayed on a display unit of a display apparatus according to a first exemplary embodiment.
Figure 4:
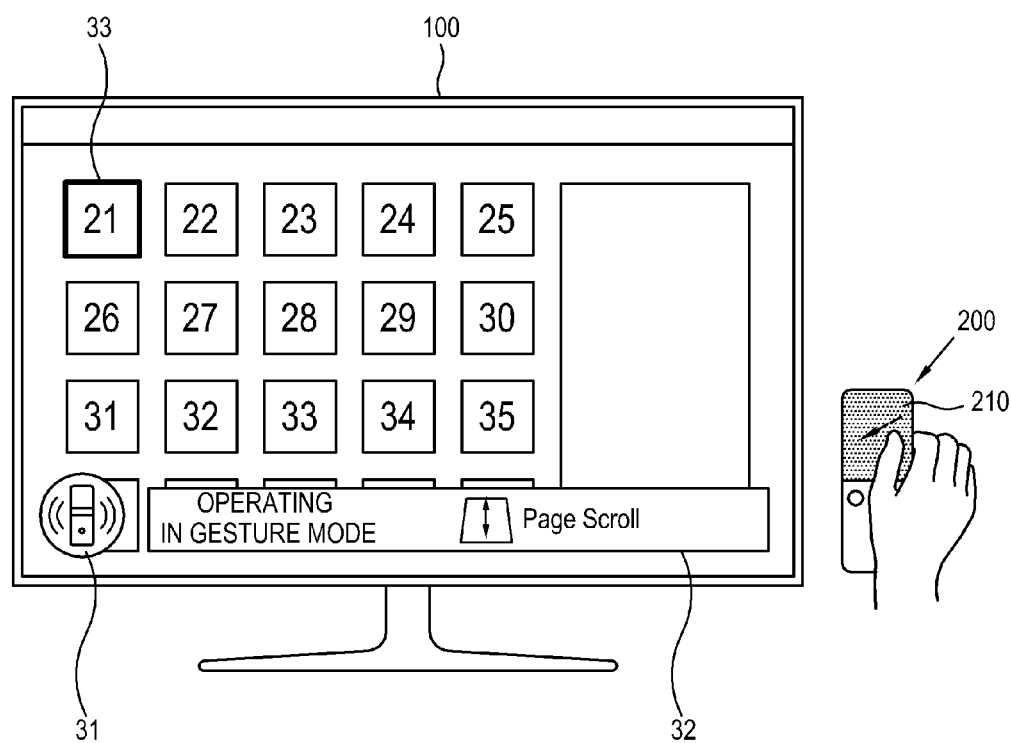
Figure 5:
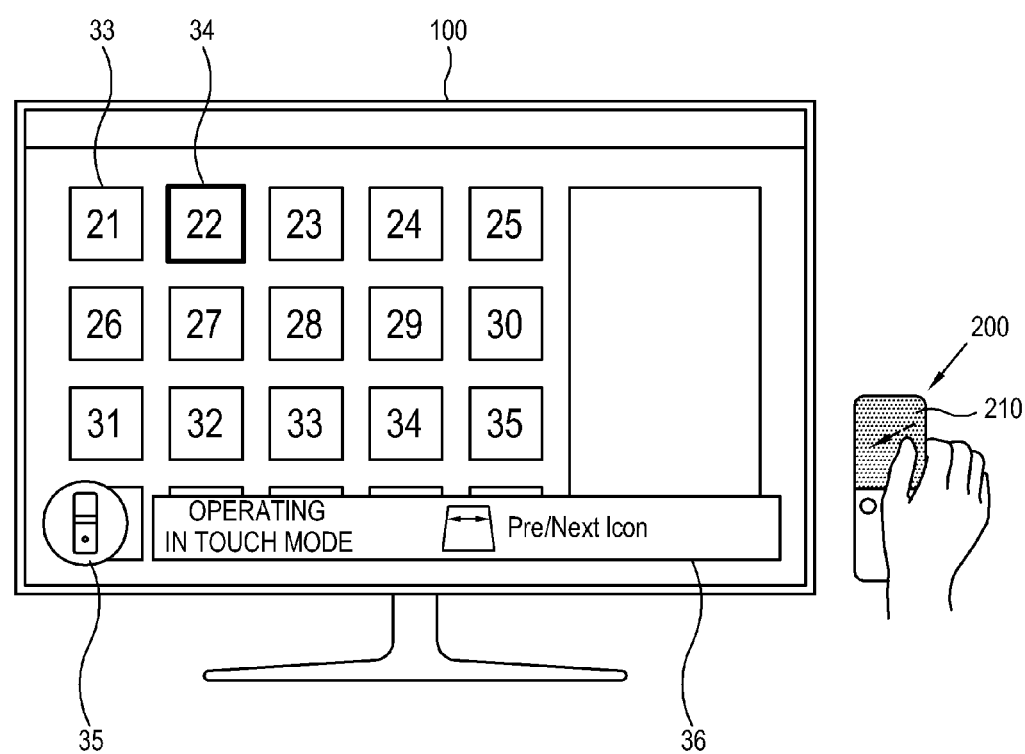

FIGS. 3 to 5 illustrate a screen which is displayed on the display unit 130 of the display apparatus 100 according to the first exemplary embodiment. Displayed UIs 31, 32, 35 and 36 may include current input mode information and change information of the input mode of the input apparatus 200 (e.g., change from the touch mode to the gesture mode and vice versa).

According to the first exemplary embodiment, the second storage unit 250 stores therein a first reference value of a user's touch input and a second reference value of a motion of the input apparatus 200. The first reference value corresponds at least one of a drag of a predetermined distance or more, a touch with a predetermined strength or more and a touch occurring predetermined number of times or more with respect to the touch sensor 210. The second reference value corresponds to a motion of a predetermined distance or more, a motion with a predetermined strength or more and a motion occurring predetermined number of times or more sensed by the motion sensor 220. The strength may be determined by one of or a combination of, a moving distance, speed and area of the input apparatus 200 by the motion.

In the present exemplary embodiment, the first and second reference values may be set as the same value and set as different values.

The second controller 260 controls the second communication unit 240 to transmit to the display apparatus 100 one of a command corresponding to the first reference value or more of the user's touch inputs sensed by the touch sensor 210, and a command corresponding to the second reference value or more of the motions of the input apparatus 200 sensed by the motion sensor 220.

The transmitted command may include a command displaying a UI indicating one of the plurality of input modes of the input apparatus 200. For example, if the motion sensor 220 senses a motion of the input apparatus 200 that is the first reference value or more while the input apparatus 200 operates in the gesture mode, the second controller 260 may control the second communication unit 250 to transmit a command to display on the display unit 130 UIs, i.e., messages 31 and 32 indicating the gesture mode as the input mode of the input apparatus 200 together with a command corresponding to the sensed motion (e.g., a page scroll command). The displayed messages 31 and 32 include icons and text.

The first controller 160 of the display apparatus 100 receives a command from the input apparatus 200 through the first communication unit 140, and controls the display unit 130 to display thereon the scrolled screen as in FIG. 4 according to the command transmitted by the input apparatus 200. As shown in FIG. 4, the first controller 160 controls the display unit 130 to display thereon the messages 31 mid 32 such as icons and text indicating a current input mode of the input apparatus 200.

The command which is transmitted by the input apparatus 200 to the display apparatus 100 may include a command which changes the input mode of the input apparatus 200 from the current operation mode to one of the plurality of input modes.

For example, while the input apparatus 200 operates in the gesture mode, the second controller 260 may change the input mode of the input apparatus 200 to the touch mode if a touch input that is the first reference value or more is sensed by the touch sensor 210 of the input apparatus 200 (i.e., if a value of a touch input sensed by the touch sensor 210 of the input apparatus 200 is greater than or equal to the first reference value) as shown in FIG. 4, and as shown in FIG. 5, may control the second communication unit 250 to transmit a command to display on the display unit 130 messages 33 and 34 indicating the change of the input mode of the input apparatus 200 to the touch mode. The displayed messages 33 and 34 may include icons and text.

The first controller 160 of the display apparatus 100 receives a command from the input apparatus 200 through the first communication unit 140, and controls the display unit 130 to display thereon a plurality of items 33 and 34 which are selectable as the input apparatus 200 is changed to the touch mode as in FIG. 5 according to the command transmitted by the input apparatus 200. As shown in FIG. 5, the first controller 160 controls the display unit 130 to display thereon messages 35 and 36 such as icons and text indicating the current input mode of the input apparatus 200.

FIGS. 3 and 5 illustrate the exemplary embodiment in which the messages 31, 32, 35 and 36 which indicate the current input mode are displayed. However, the display apparatus 100 may display a message indicating the change of the input mode from one mode (e.g., gesture mode) to another mode (e.g., touch mode) such as "changed to touch mode".

A user may select the item 34 from the plurality of items 33 and 34 displayed on the display unit 130, by manipulating the touch sensor 210 of the input apparatus 200, such as tapping and dragging. The second controller 260 controls the second communication unit 250 to transmit a command to the display apparatus 100 corresponding to the sensing result of the touch sensor 210.

The first controller 160 controls the display unit 130 to display thereon a user's selection result according to the command transmitted by the input apparatus 200. The first controller 160 controls the display unit 130 to highlight the selected item 34 as in FIG. 5 through focus, point, cursor, highlight, or a flicking process.

If buttons such as menu keys, number keys and directions keys (four direction keys) are further provided in the input apparatus 200, a user may select a UI displayed on the display unit 130 by manipulating the buttons as well as the touch sensor 210.

According to the exemplary embodiment, after the input mode has been changed to the gesture mode by the sensed motion of the input apparatus 200 which is the second reference value or more, the second controller 260 disregards a user's touch input that is less than the first reference value.

As a result, according to the present exemplary embodiment, if one of the touch sensor 210 and the motion sensor 220 senses the input that is the first or second reference value or more, the input which is less than the first or second reference value sensed by the other one of the touch sensor 210 and the motion sensor 220 is disregarded. Even after one of the touch sensor 210 mid the motion sensor 220 senses the first or second reference value or more, the input that is the first or second reference value or more and sensed by the other one of the touch sensor 210 and the motion sensor 220 becomes a valid input, and thus the input mode is changed.

According to an embodiment, the input apparatus 200 which supports both the touch sensor 210 and the motion sensor 220 operates in only one input mode and thus the possibility of operational errors is reduced. Also, the input modes are interchanged by the touch that is the first reference value or more (i.e., if a value of the sensed touch input is greater than or equal to the first reference value) or by the motion that is the second reference value or more (i.e., if a value of the sensed motion is greater than or equal to the second reference value), and thus the mode is naturally changed without artificial manipulation by a user, thereby reducing inconvenience.

Hereinafter, a control, method of the display system 1 according to the first exemplary embodiment will be described.

Figure 6:
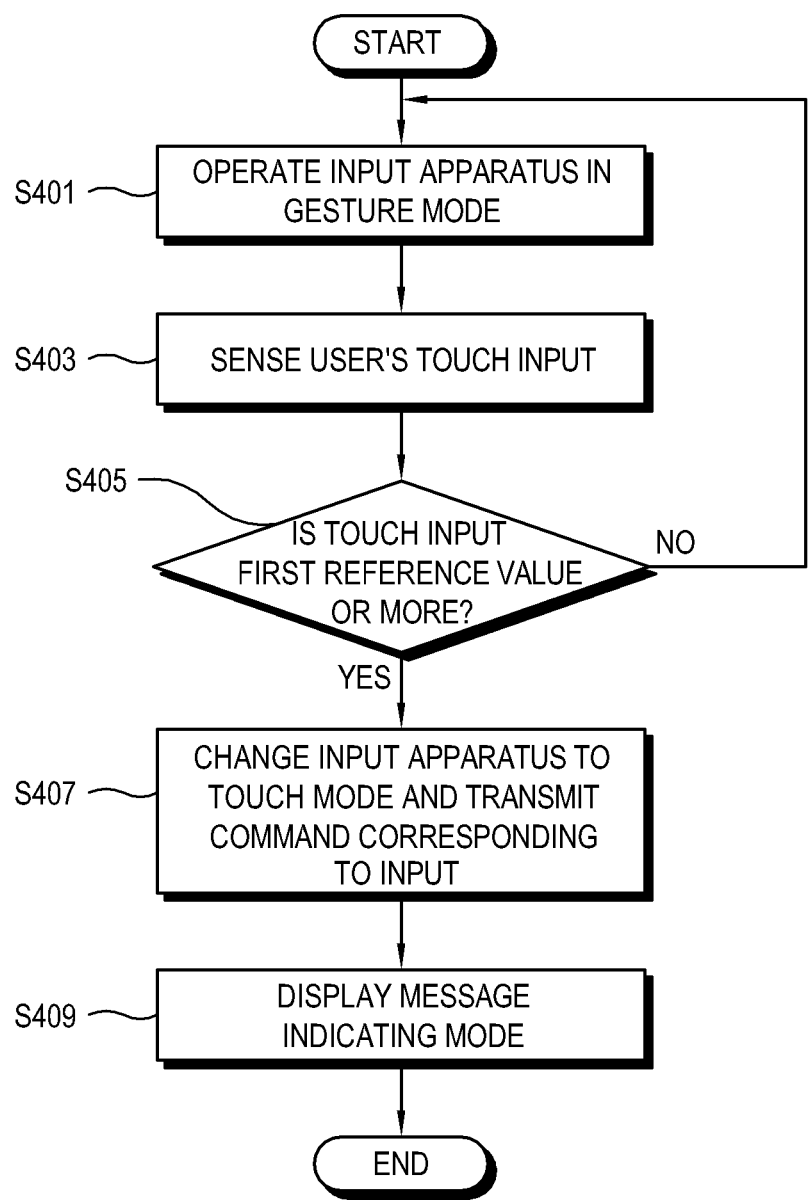
FIGS. 6 and 7 are flowcharts showing a control method of the display system according to the first exemplary embodiment.
Figure 7:
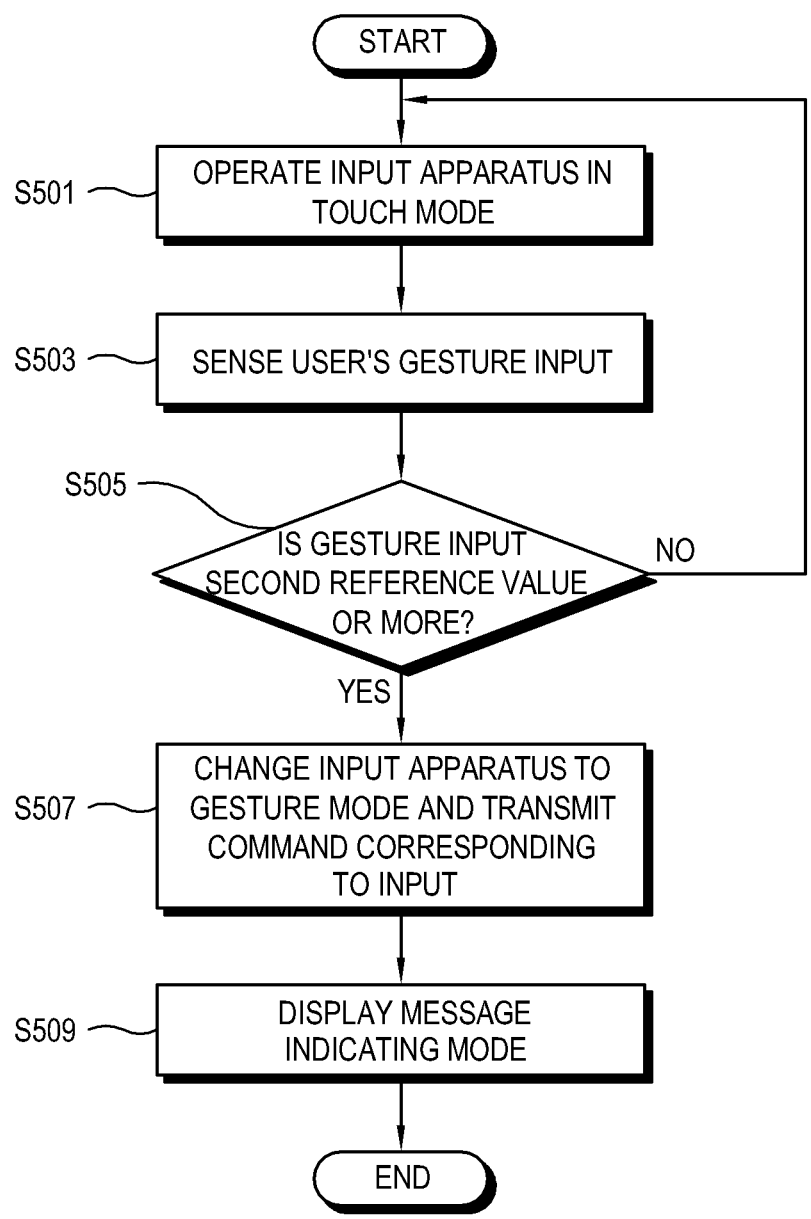

FIGS. 6 and 7 are flowcharts showing the control method of the display system 1 according to the first exemplary embodiment.

As shown therein, the input apparatus 200 may operate in the gesture mode as the input mode in which the input apparatus 200 operates according a sensing result of the motion sensor 220 (S401).

The input apparatus 200 senses a user's touch input to the touch sensor 210 while operating in the gesture mode (S403). The gesture mode may have been changed at operation S507 in FIG. 7 which will be described later.

The second controller 260 of the input apparatus 200 determines whether the touch input sensed at operation S403 is the first reference value or more, i.e., whether a value of the sensed touch input is greater than or equal to the first reference value (S405). The first reference value may correspond to at least one of a drag of a predetermined distance or more, a touch with a predetermined strength or more and a touch occurring predetermined number of times or more with respect to the touch sensor 210, and is stored in advance in the second storage unit 250.

If it is determined that the touch input is the first reference value or more at operation S405, the second controller 260 changes the input mode of the input apparatus 200 to the touch mode, and controls the second communication unit 250 to transmit a command to the display apparatus 100 corresponding to the touch input sensed at operation S403 (S407).

The first controller 160 of the display apparatus 100 performs an operation corresponding to the command received at operation S407, and controls the display unit 130 to display the messages 35 and 36 indicating the input mode of the input apparatus 100 (S409). The messages displayed at operation S409 may include messages which indicate that the input mode of the input apparatus 200 is changed to the touch mode.

If it is determined that the touch input is less than the first reference value at operation S405, the second controller 260 disregards the touch input sensed at operation S403.

The exemplary embodiment in FIG. 7 is different from the exemplary embodiment in FIG. 6 because, in the former exemplary embodiment, the input apparatus 200 is changed to the gesture mode while operating in the touch mode.

As shown in FIG. 7, the input apparatus 200 may operate in the touch mode as the input mode in which the input apparatus 200 operates according to the sensing result of the touch sensor 210 (S501). The touch mode may have been changed at operation S404 in FIG. 6.

While in the touch mode, the input apparatus 200 senses the motion of the input apparatus 200 with respect to the motion sensor 220 (S503).

The second controller 260 of the input apparatus 200 determined whether the motion sensed at operation S503 is the second reference value or more, i.e., if a value of the sensed motion is greater than or equal to the second reference value (S505). The second reference value may correspond to at least one of a motion of a predetermined distance or more, a motion with a predetermined strength or more and a motion occurring predetermined number of times or more sensed by the motion sensor 220, and stored in advance in the second storage unit 250. In the present exemplary embodiment, the second reference value may be set as the same value as, or a different value from, the first reference value at operation S405 in FIG. 6.

If it is determined that the motion input is the second reference value or more at operation S505, the second controller 260 changes the input mode of the input apparatus 200 to the gesture mode, and controls the second communication unit 250 to transmit a command to the display apparatus 100 corresponding to the motion input sensed at operation S503 (S507).

The first controller 360 of the display apparatus 300 performs an operation according to the command transmitted at operation S507, and controls the display unit 330 to display the messages 31 and 32 indicating the input mode of the input apparatus 100 (S509). The messages displayed at operation 3509 may include messages which indicate that the input mode of the input apparatus 200 is changed to the gesture mode.

If it is determined that the motion input is less than the second reference value at operation S505, the second controller 260 disregards the motion input sensed at operation S503.

According to the first exemplary embodiment, as the input modes are interchanged by the touch or motion that is the reference values or more, the interaction is not suspended and the input mode is changed naturally without, artificial manipulation by a user, thereby improving user's convenience.

FIGS. 8 to 12 illustrate a screen which is displayed on the display unit 130 of the display apparatus 100 according to a second exemplary embodiment.

The screen according to the second exemplary embodiment is characterized, by displaying a change process of the input mode in stages, as compared to the screen according to the first exemplary embodiment shown in FIGS. 3 to 5. As elements other than the UIs displayed on the display unit 130 have the same reference numerals and names as those according to the first exemplary embodiment, their detailed description will not be repeated.

According to the second exemplary embodiment, the second storage unit 250 stores therein a third reference value of a user's touch input and a motion of the input apparatus 100. The third reference value is a plurality of values which are set in stages for changing the input mode.

More specifically, the third reference value includes a plurality of values set in stages (e.g., first input value, second input value and third input value) corresponding to a motion with a predetermined strength, occurring predetermined number of times or more and to a predetermined distance or more sensed by the motion sensor 220 and corresponding to a drag of a predetermined distance or more, a tap or click occurring predetermined number of times or more and a touch with a predetermined strength or more with respect to the touch sensor 210. The strength is determined by at least one of, or a combination of, a moving distance, speed and area of the input apparatus 200 by the motion.

The second controller 260 controls the second communication unit 250 to transmit a command to the display apparatus 100 to display a UI regarding the change of the input mode of the input apparatus 200.

The second controller 260 may control the second communication unit 250 to transmit a command to display a UI which, in stages, displays the change of the input mode of the input apparatus 200 to the gesture mode according to at least one of the distance, strength and number of times of the motion of the input apparatus 200 sensed by the motion sensor 220.

Figure 8:
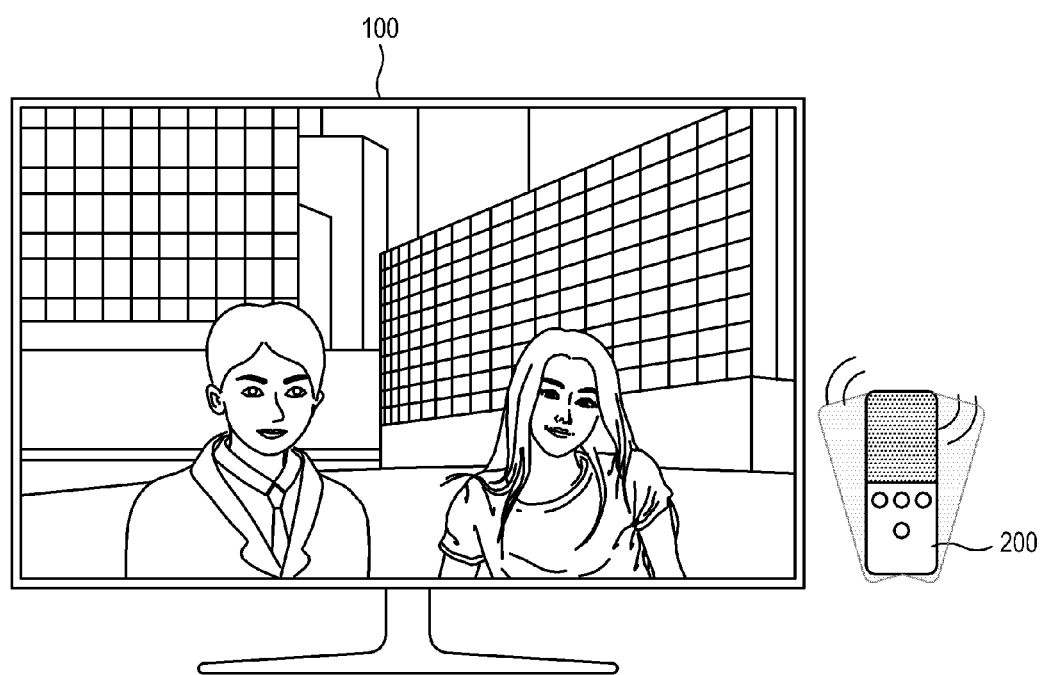
FIGS. 8 to 12 illustrate a screen which is displayed on a display unit of a display apparatus according to a second exemplary embodiment.

For example, while the display apparatus 100 communicates with the input apparatus 200 as in FIG. 8, a user may utilize a motion of shaking the input apparatus 200 to use the input apparatus 200 in the gesture mode.

The motion sensor 220 may sense the motion of the input apparatus 200, and the second controller 260 may control the second communication unit 250 to transmit a command to display in the display apparatus 100 a UI regarding the input mode, based on at least one of the distance, strength and number of times of the sensed motion. Displayed UIs 61 and 62 include icons and test. The second controller 260 may compare the sensing result of the motion sensor 220 with the values set in stages and stored in the second storage unit 250, and transmit a command corresponding to the comparison result, through the second communication unit 240.

The first controller 160 of the display apparatus 100 receives the command from the input apparatus 200 through the first communication unit 150, and controls the display unit 130 to display UIs 61, 62 and 63 such as icons and text displaying the change of the input mode of the input apparatus 200 to the gesture mode in stages as in FIGS. 8 to 12 according to the command transmitted by the input apparatus 200. A user may immediately check the feedback of the strength, number of times and distance of the motion of shaking the input apparatus 200, through the display apparatus 200.

The first controller 160 adjusts, in stages, a degree of transparency of the UIs 61 and 62 displayed on the display unit 130 corresponding to at least one of the distance, strength and number of times of the motion of the input apparatus 200.

Figure 9:
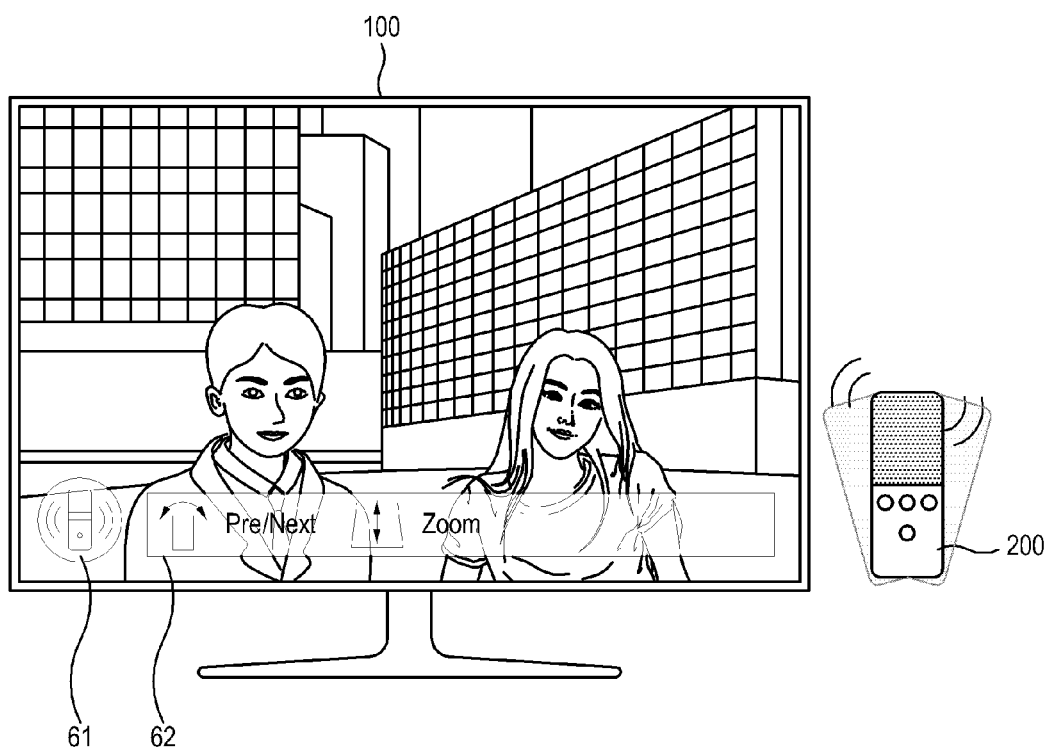

For example, if a user shakes the input apparatus 200 weakly as a first input, the second controller 260 transmits information corresponding to the first input value to the display apparatus 100 through the second communication unit 250, and the first controller 160 receives strength information of the first input through the first communication unit 150 and controls the display unit 130 to display the UIs 61 and 62 with a corresponding degree of transparency as in FIG. 9.

A user may determine that a stronger motion is needed to change the input mode to the gesture mode by checking the degree of transparency of the UIs 61 and 62 displayed on the display unit 130 in FIG. 9 and may shake the input apparatus 200 more strongly as a second input. The second controller 260 transmits information corresponding to the second input value to the display apparatus 100 through the second communication unit 250, and the first controller 160 receives strength information of the second input through the first communication unit 150 and controls the display unit 130 to display the UIs 63 and 64 with a corresponding degree of transparency as in FIG. 10. The UIs 63 and 64 in FIG. 10 are clearer (less transparent) than the UIs 61 and 62 in FIG. 9.

Figure 10:
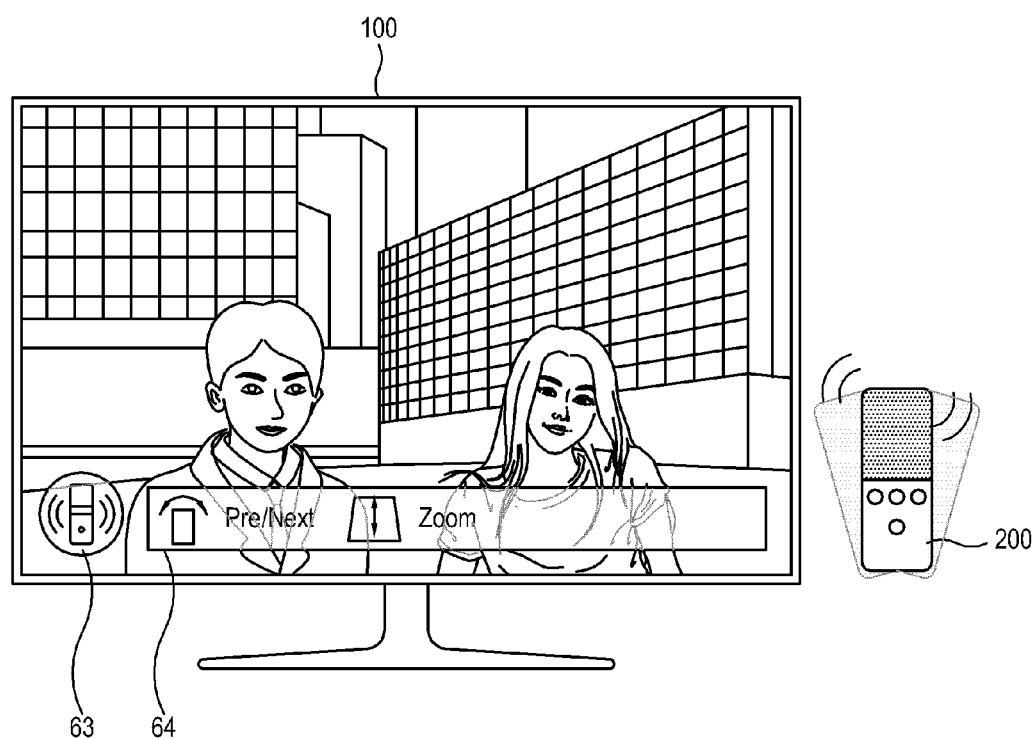
Figure 11:
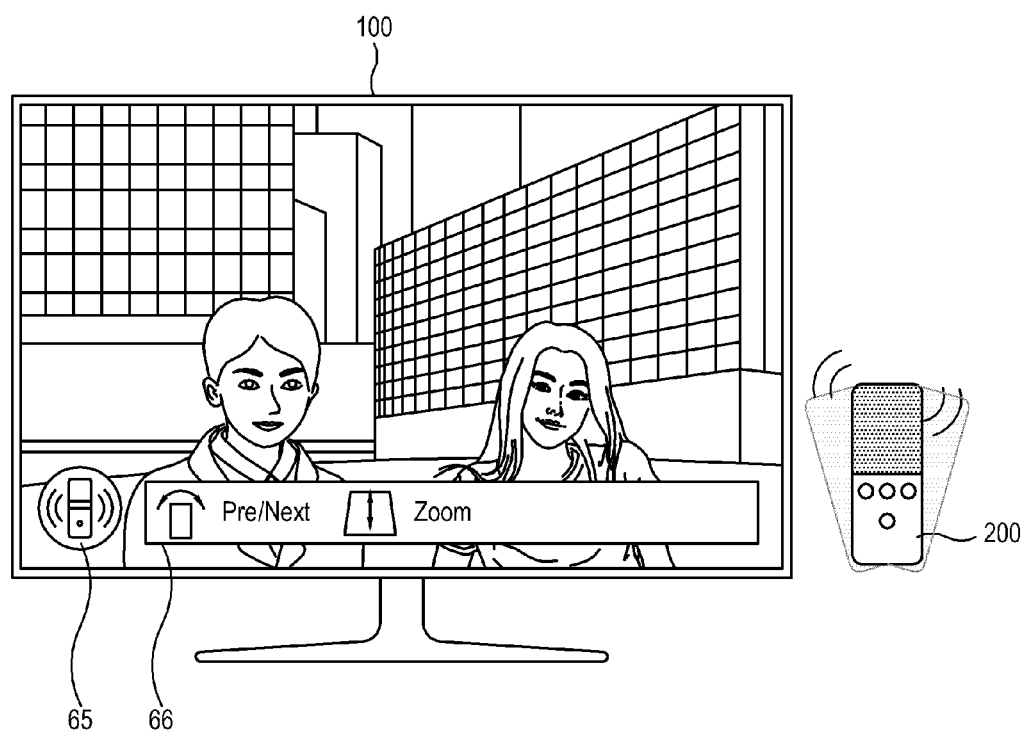

Further, a user may determine that a stranger motion is needed to change the input mode to the gesture mode by checking the degree of transparency of the UIs 63 and 64 displayed on the display unit 130 as in FIG. 10, and then shake the input apparatus 200 more strongly as a third input. The second controller 260 transmits information corresponding to the third input value to the display apparatus 100 through the second communication unit 250, and the first controller 160 receives strength information of the third input through the first communication unit 150 and controls the display unit 130 to display the UIs 64 and 65 with a corresponding degree of transparency as in FIG. 11. The UIs 65 and 66 in FIG. 11 are dearer (less transparent) than the UIs 61, 62, 63 and 64 in FIGS. 9 and 10.

That is, the UIs 61, 62, 63, 64, 65 and 66 displayed on the display unit 130 are adjusted in the degree of transparency in stages according to the change of the input mode.

The first to third inputs have been explained to be distinguished by the strength of the motion of the input apparatus 200. However, the change of the input mode may be displayed in stages according to a number of times of the motion. For example, if the input apparatus 200 is shaken one time, the UIs 61 and 62 as in FIG. 9 may be displayed. If the input apparatus 200 is shaken two to four times, the UIs 63 and 64 as in FIG. 10 may be displayed. If the input apparatus 200 is shaken five times or more, the UIs 65 and 66 as in FIG. 11 may be displayed. Also, the steps of changing the input mode may be determined taking into account collective strengths and number of times of the motion of the input apparatus 200.

The first to third inputs may correspond to the first to third input values, respectively, stored in the second storage unit 250.

The display apparatus 100 according to the present exemplary embodiment may display the UIs 65 and 66 of the display unit 130 opaquely as shown in FIG. 11 if the change of the input mode to the gesture mode is completed.

That is, if the change of the input mode to the gesture mode is completed, the second controller 260 may control the second communication unit 250 to transmit a command to the display apparatus 100 to display the UI opaquely regarding the input mode, and the first controller 160 give feedback to a user regarding the completion of the change by displaying the UIs 65 and 66 opaquely according to the command transmitted by the input apparatus 200.

The UIs 61, 62, 63, 64, 65 and 66 displayed in FIGS. 9 to 11 include icons 61, 63 and 645 indicating the input mode of the input apparatus 200, and guides 62, 54 and 66 which are provided for inputting a motion of the input apparatus 200 in the gesture mode.

That is, a user may determine that the input mode is changed to the gesture mode through the icons 61, 63 mid 65 displayed in the display apparatus 100, and may rotate the input apparatus 200 to the left and right sides through the guides 62, 64 and 66 to select a previous or next image, and rotate the input apparatus 200 up and down to zoom in/out the screen.

The UI regarding the input mode according to the exemplary embodiment may further include information regarding the strength or number of times of a motion which is needed to complete the change of the input mode. For example, the guides 62, 64 and 66 displayed on the display unit 130 may provide text indicating the strength or number of times of the motion of the input apparatus 200 which is needed to complete the change of the input mode to the gesture mode.

It has been explained that the UIs 61, 62, 63, 64, 65 and 66 regarding the input mode according to the exemplary embodiment shown in FIGS. 9 to 11 display the change process of the input mode with the degree of transparency. However, the UI according to the embodiment is not limited to the foregoing. For example, UIs 67 and 68 regarding the input mode may include a gauge which indicates the change of the input mode in stages, as shown in FIG. 11.

Figure 12:
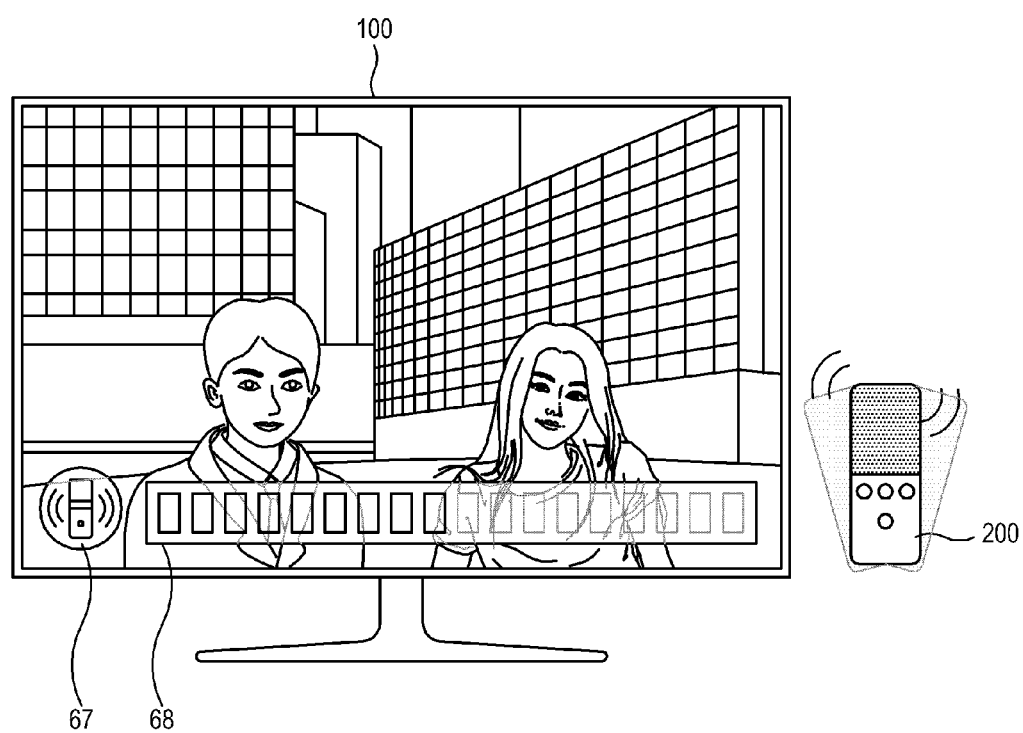

The first controller 160 controls the display unit 130 to move a state bar of the gauge in FIG. 12 to the right side corresponding to the change state of the input mode and display the moved state bar, based on the command including information regarding the input mode transmitted by the input apparatus 200. A user may determine the degree of change of the input mode according to the location of the state bar of the gauge and complete the change of the input mode by shaking the input apparatus 200 more strongly, etc.

The UIs 61, 62, 63, 64, 65 and 66 regarding the input mode according to the present exemplary embodiment may display the change of the input mode to the touch mode in stages. A user may check the UI regarding the input mode displayed in the display apparatus 100 and determine the degree of change of the input mode to the touch mode, and complete the change of the input mode by touching the touch sensor 210 more strongly etc.

Hereinafter, a control method of the display system 1 according to the second exemplary embodiment will be described.

FIG. 13 is a flowchart showing the control method of the display system 1 according to the second exemplary embodiment.

As shown therein, the input apparatus 200 may operate in the touch mode as the input mode in which it operates according to the sensing result of the touch sensor 210 (S701).

The input apparatus 200 senses a motion thereof with respect to the motion sensor 220 while operating in the touch mode (S703).

The second controller 260 of the input apparatus 200 transmits a corresponding command to the display apparatus 100, based on at least one of the distance, strength and number of times of the motion of the input apparatus 200 sensed at operation S703 (S705).

The first controller 160 of the display apparatus 100 receives the command transmitted at operation S705, and controls the display unit 130 to display the UIs 61, 62, 63, 64, 65, 66, 67 and 68 regarding the input mode of the input apparatus 200 according to the received command (S707). The UIs 61, 62, 63, 64, 65, 66, 67 and 68 which are displayed at operation S707 may display the change of the input mode of the input apparatus 200 to the gesture mode in stages by using the degree of transparency or the gauge, and may display the UIs 65 and 66 opaquely if the change of the input mode is completed. The UIs regarding the input mode may further include information regarding the strength or number of times of the motion which is needed to complete the change of the input mode.

In the exemplary embodiment in FIG. 13, the input apparatus 200 is changed from the touch mode to the gesture mode. However, the embodiments includes the case where the input apparatus 200 is changed from the gesture mode to the touch mode, and may apply to the case where the input mode is changed from a general mode using buttons to the gesture mode or the touch mode.

According to the second exemplary embodiment, the UIs which provide the information regarding the change of the input mode of the input apparatus 200 are displayed, and a user receives proper visual feedback in real-time regarding the change of the input mode and therefore may feel less confused and more convenient.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. An input apparatus of a display apparatus, the input apparatus comprising:
a communication unit configured to communicate with the display apparatus;
a touch sensor configured to sense a touch input;
a motion sensor configured to sense a motion of the input apparatus; and
a controller configured to:
set the input apparatus to operate in a touch mode, in which the communication unit transmits a command to the display apparatus according to the touch input to the touch sensor, rather than a gesture mode, in which the communication unit transmits a command to the display apparatus according to the motion of the input apparatus, in response to the touch input being a first reference value or more while the input apparatus operates in the gesture mode; and
maintain the input apparatus in the gesture mode in response to the touch input being less than the first reference value while the input apparatus operates in the gesture mode.

2. The input apparatus according to claim 1, wherein the controller is configured to set the input apparatus to operate in the gesture mode in response to the motion of the input apparatus being a second reference value or more while the input apparatus operates in the touch mode.

3. The input apparatus according to claim 2, wherein the controller is configured to control the communication unit to transmit a command to the display apparatus to display a graphic user interface (GUI) regarding a change of an input mode comprising the touch mode and the gesture mode.

4. The input apparatus according to claim 3, wherein the GUI displays a process of changing the input mode in the display apparatus by stages.

5. The input apparatus according to claim 4, wherein the GUI is adjusted by stages by using a degree of transparency according to the change of the input mode.

6. The input apparatus according to claim 5, wherein the controller is configured to control the communication unit to transmit a command to display the GUI opaquely in response to the change of the input mode being completed.

7. The input apparatus according to claim 4, wherein the GUI comprises a gauge that displays the change of the input mode by stages.

8. The input apparatus according to claim 2, wherein the controller is configured to maintain the input apparatus in the touch mode in response to the motion of the input apparatus being less than the second reference value while the input apparatus operates in the touch mode.

9. The input apparatus according to claim 2, wherein the first reference value comprises a value corresponding to at least one of a drag to a predetermined distance or more, a touch with a predetermined strength or more, and a touch by predetermined times or more with respect to the touch sensor, and
the second reference value comprises a value corresponding to at least one of a motion to a predetermined distance or more, a motion with a predetermined strength or more, and a motion by predetermined times or more sensed by the motion sensor.

10. The input apparatus according to claim 2, wherein the first reference value comprises a value corresponding to a touch by predetermined times or more with respect to the touch sensor, and
the second reference value comprises a value corresponding to a motion by predetermined times or more sensed by the motion sensor.

11. An input apparatus of a display apparatus, the input apparatus comprising:
a communication unit configured to communicate with the display apparatus;
a touch sensor configured to sense a touch input;
a motion sensor configured to sense a motion of the input apparatus; and
a controller configured to:
set the input apparatus to operate in a gesture mode, in which the communication unit transmits a command to the display apparatus according to the motion of the input apparatus, rather than a touch mode, in which the communication unit transmits a command to the display apparatus according to the touch input to the touch sensor, in response to the motion of the input apparatus being a reference value or more while the input apparatus operates in the touch mode; and maintain the input apparatus in the touch mode in response to the motion of the input apparatus being less than the reference value while the input apparatus operates in the touch mode.

12. The input apparatus according to claim 11, wherein the controller is configured to control the communication unit to transmit a command to the display apparatus to display a user interface (UI) indicating a process of changing the input mode of the input apparatus by stages according to at least one of strength, times, and distance of the motion of the input apparatus that is sensed by the motion sensor.

13. The input apparatus according to claim 12, wherein the UI further comprises information regarding at least one of distance, strength, and times of a motion that is needed to complete the change of the input mode.

14. A display apparatus comprising:
a display unit configured to display an image;
a communication unit configured to communicate with an input apparatus of the display apparatus, the input apparatus comprising a touch sensor configured to sense a touch input and a motion sensor configured to sense a motion of the input apparatus; and
a controller configured to:
control the display unit to display a graphic user interface (GUI) regarding a change of an input mode of the input apparatus to a touch mode, in which the input apparatus is set to operate according to the touch input to the touch sensor rather than the motion of the input apparatus, in response to a command corresponding to the touch input being a first reference value or more received through the communication unit from the input apparatus, the GUI comprising a message indicating the touch mode as the input mode, and
control the display unit to display the GUI regarding a change of the input mode to the gesture mode, in which the input apparatus is set to operate according to the motion of the input apparatus rather than the touch input to the touch sensor, in response to a command corresponding to the motion of the input apparatus being a second reference value or more received through the communication unit, the GUI comprising a message indicating the gesture mode as the input mode.

15. The display apparatus according to claim 14, wherein the GUI displays a process of changing the input mode by stages.

16. The display apparatus according to claim 15, wherein the GUI is adjusted by stages by using a degree of transparency according to the change of the input mode.

17. The display apparatus according to claim 16, wherein the controller is configured to control the display unit to display the GUI opaquely in response to the change of the input mode being completed.

18. The display apparatus according to claim 15, wherein the GUI comprises a gauge that displays the change of the input mode by stages.

19. The display apparatus according to claim 14, wherein the message comprises at least one of an icon, text, and a command corresponding to a motion of the input apparatus that is sensed by the input apparatus.

20. A display apparatus comprising:
a display unit configured to display an image;
a communication unit configured to communicate with an input apparatus of the display apparatus, the input apparatus comprising a touch sensor configured to sense a touch input and a motion sensor configured to sense a motion of the input apparatus; and
a controller configured to control the display unit to display a graphic user interface (GUI) regarding a change of an input mode of the input apparatus to a gesture mode, in which the input apparatus is set to operate according to the motion of the input apparatus rather than the touch input to the touch sensor, in response to a command corresponding to the motion of the input apparatus being a reference value or more received through the communication unit, the GUI comprising a message indicating the gesture mode as the input mode.

21. The display apparatus according to claim 20, wherein the GUI displays the change of the input mode to the gesture mode by stages.

22. The display apparatus according to claim 20, wherein the GUI further comprises information regarding at least one of distance, strength, and times of a motion that is needed to complete the change of the input mode.

23. A control method of an input apparatus of a display apparatus, the control method comprising:
operating the input apparatus in a gesture mode, in which the input apparatus transmits a command to the display apparatus according to a motion of the input apparatus, as an input mode, the input apparatus comprising a touch sensor configured to sense a touch input and a motion sensor configured to sense the motion of the input apparatus;
sensing a touch input to the touch sensor,
setting the input apparatus to operate in a touch mode, in which the input apparatus transmits a command to the display apparatus according to the touch input to the touch sensor, rather than the gesture mode, in response to the touch input being a first reference value or more while the input apparatus operates in the gesture mode; and
maintaining the input apparatus in the gesture mode in response to the touch input being less than the first reference value while the input apparatus operates in the gesture mode.

24. The control method according to claim 23, further comprising:
sensing the motion of the input apparatus, the sensed motion being a second reference value or more; and
setting the input apparatus to operate in the gesture mode, in which the input apparatus transmits a command to the display apparatus according to the motion of the input apparatus, rather than the touch mode.

25. The control method according to claim 24, further comprising transmitting a command to the display apparatus to display a graphic user interface (GUI) regarding the change of the input mode.

26. The control method according to claim 25, wherein the GUI displays a process of changing the input mode by stages in the display apparatus.

27. The control method according to claim 26, wherein the GUI is adjusted by stages by using a degree of transparency according to the change of the input mode.

28. The control method according to claim 27, further comprising transmitting a command to display the GUI opaquely in response to the change of the input mode being completed.

29. The control method according to claim 26, wherein the GUI comprises a gauge that displays the change of the input mode by stages.

30. The control method according to claim 24, further comprising maintaining the input apparatus in the gesture mode in response to the sensed motion being less than the second reference value.

31. The control method according to claim 24, wherein the first reference value comprises a value corresponding to at least one of a drag to a predetermined distance or more, a touch with a predetermined strength or more and a touch by predetermined times or more with respect to the touch sensor, and the second reference value comprises a value corresponding to at least one of a motion to a predetermined distance or more, a motion with a predetermined strength or more, and a motion by predetermined times or more sensed by the motion sensor.

32. A control method of an input apparatus of a display apparatus, the control method comprising:

operating the input apparatus in a touch mode, in which the input apparatus transmits a command to the display apparatus according to a touch input to a touch sensor, as an input mode, the input apparatus comprising the touch sensor configured to sense the touch input and a motion sensor configured to sense a motion of the input apparatus;

sensing a motion of the input apparatus;

setting the input apparatus to operate in a gesture mode, in which the input apparatus transmits a command to the display apparatus according to the motion of the input apparatus, rather than the touch mode, in response to the motion of the input apparatus being a reference value or more while the input apparatus operates in the touch mode; and maintaining the input apparatus in the touch mode in response to the motion of the input apparatus being less than the reference value while the input apparatus operates in the touch mode.

33. The control method according to claim 32, further comprising transmitting a command to the display apparatus to display a user interface (UI) by stages regarding the change of the input mode.

34. The control method according to claim 33, wherein the transmitting the command comprises transmitting a command to the display apparatus to display information regarding at least one of distance, strength, and times of a motion that is needed to complete the change of the input mode.

35. A control method of a display apparatus comprising:

receiving a command corresponding to a touch input being a first reference value or more from an input apparatus, the input apparatus comprising a touch sensor configured to sense the touch input and a motion sensor configured to sense a motion of the input apparatus; and displaying a graphic user interface (GUI) regarding a change of an input mode to a touch mode, in which the input apparatus is set to operate according to the touch input to the touch sensor, rather than a gesture mode, in which the input apparatus is set to operate according to the motion of the input apparatus based on the received command, the GUI comprising a message indicating the touch mode as the input mode;

receiving another command corresponding to the motion of the input apparatus being a second reference value or more from the input apparatus; and displaying the GUI regarding the change of the input mode to the gesture mode rather than the touch mode based on the received other command, the GUI comprising a message indicating the gesture mode as the input mode.

36. The control method according to claim 35, further comprising displaying a process of changing the input mode by stages.

37. The control method according to claim 36, wherein the displaying by stages comprises adjusting a degree of transparency of the GUI by stages according to the change of the input mode.

38. The control method according to claim 37, further comprising displaying the GUI opaquely in response to the change of the input mode being completed.

39. The control method according to claim 36, wherein the displaying by stages comprises displaying the change of the input mode by stages through a gauge.

40. A control method of a display apparatus, the control method comprising:

receiving a command corresponding to a motion of a input apparatus being a reference value or more from the input apparatus, the input apparatus comprising a touch sensor configured to sense a touch input and a motion sensor configured to sense the motion of the input apparatus; and displaying a graphic user interface (GUI) regarding a change of an input mode to a gesture mode, in which the input apparatus is set to operate according to the motion of the input apparatus, rather than a touch mode, in which the input apparatus is set to operate according to the touch input to the touch sensor, based on the received command, the GUI comprising a message indicating the gesture mode as the input mode.

41. The control method according to claim 40, wherein the displaying the UI comprises displaying the change of the input mode to the gesture mode by stages.

42. The control method according to claim 40, wherein the displaying the UI comprises displaying information regarding at least one of distance, strength, and times of a motion that is needed to complete the change of the input mode.

43. A display system comprising:

a display apparatus configured to communicate with an input apparatus, and display a graphic user interface (GUI); and the input apparatus configured to communicate with the display apparatus, the input apparatus comprising:

a touch sensor configured to sense a touch input;

a motion sensor configured to sense a motion of the input apparatus; and a controller configured to recognize the touch input being a first reference value or more sensed by the touch sensor while the input apparatus operates in a gesture mode, in which the input apparatus is set to operate according to the motion of the input apparatus, recognize the motion of the input apparatus being a second reference value or more sensed by the motion sensor while the input apparatus operates in a touch mode, in which the input apparatus is set to operate according to the touch input to the touch sensor, and transmit a command to the display apparatus in response to the recognition of the touch input being the first reference value or more or the motion of the input apparatus being the second reference value or more, wherein the display apparatus receives the command from the input apparatus and displays the GUI regarding a change of an input mode of the input apparatus based on the received command, the input mode comprising the touch mode and the gesture mode.

44. The display system according to claim 43, wherein the GUI displays the change of the input mode by stages.

* * * * *